J. RAVEN.
LIFTING JACK.
APPLICATION FILED APR. 12, 1920.
1,398,798.
Patented Nov. 29, 1921.
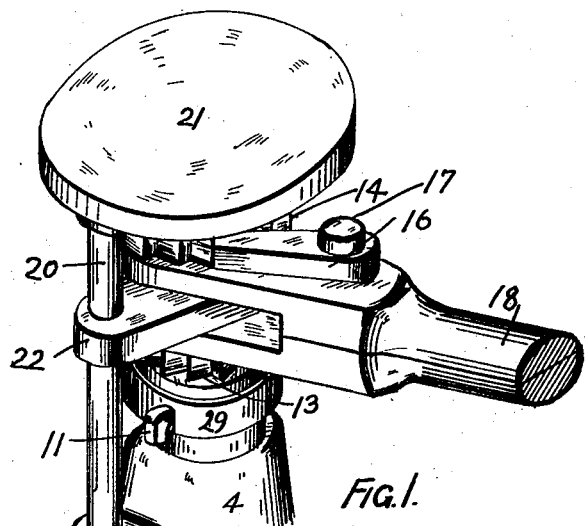
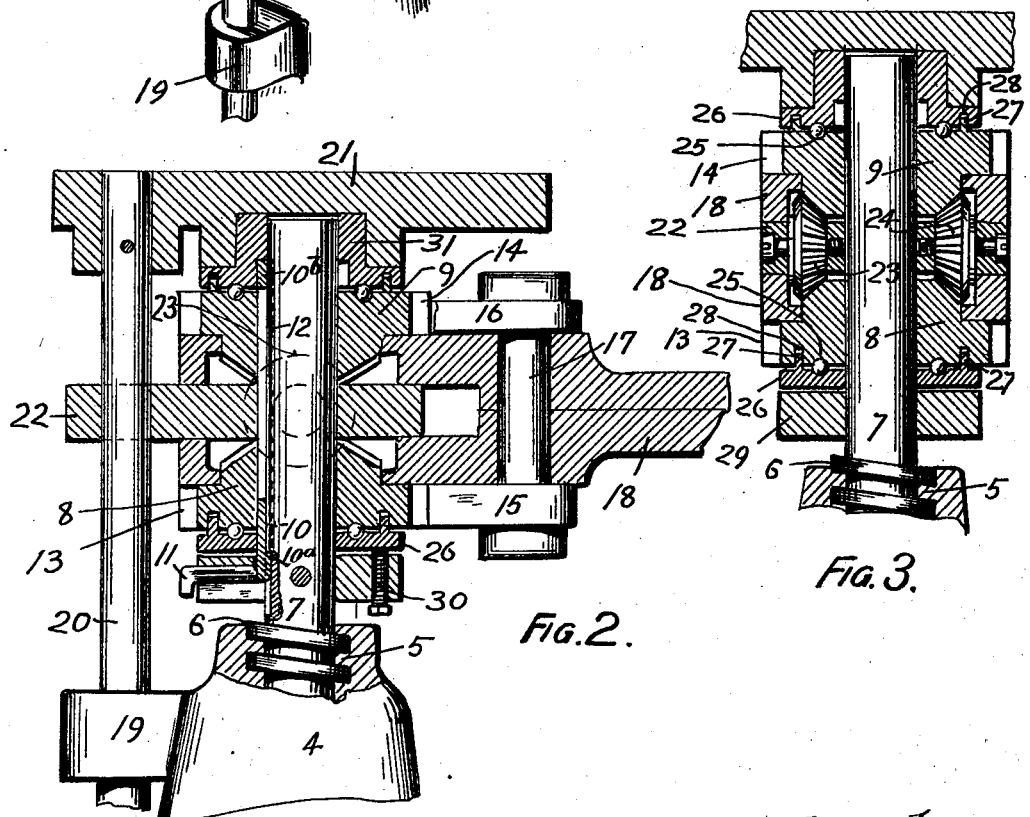
Inventor
John Raven
by
*[signature]*
Attorney

UNITED STATES PATENT OFFICE.

JOHN RAVEN, OF DEERVALE, VIA ARMIDALE, NEW SOUTH WALES, AUSTRALIA.

LIFTING-JACK.

1,398,798.   Specification of Letters Patent.   Patented Nov. 29, 1921.

Application filed April 12, 1920. Serial No. 373,252.

*To all whom it may concern:*

Be it known that I, JOHN RAVEN, a subject of the King of Great Britain, residing at Deervale, Via Armidale, in the State of New South Wales, Commonwealth of Australia, have invented certain new and useful Improvements in Lifting-Jacks, of which the following is a specification.

This invention has reference to improvements in lifting screw jacks and has for its object a construction whereby the weight supporting table may be readily raised either continuously or intermittently on reciprocation of the operating lever, with a minimum of friction.

In the accompanying drawings,

Figure 1 is a perspective view partly broken away of a lifting jack constructed according to the invention, while, Fig. 2 is a central sectional elevation, Fig. 3 is a horizontal sectional view showing the stationary or holding arm and the intermediate bevel pinions.

4 is a bottle or standard provided with the usual thread 5 in which the threaded portion 6 of a spindle 7 engages. On the spindle are oppositely rotatable wheels 8 and 9 one or other of which is adapted to be locked or unlocked therewith by means of the key or locking piece 10 taking in a key way 12 and having spaced lugs or projections 10$^a$, 10$^b$ and an exposed finger piece 11 at one end. The lugs or projections 10$^a$ and 10$^b$ are adapted to engage in keyways formed in the bevel wheels 8 and 9 respectively according to the position of the locking piece 10. The bevel wheels 8 and 9 have the respective ratchets 13 and 14 capable of being engaged by the spring pawls 15 and 16 carried on the bolt 17 which passes through the divided reciprocable lever 18. On the standard is a guide 19 in which slides a rod 20, which rod is secured to the supporting table 21 and rises or falls with it. This rod 20 also passes through a holding plate 22 which is bored to permit the spindle 7 to pass therethrough so that said plate acts as a holding arm when the hand lever 18 is reciprocated and carries the intermediate bevel pinions 23 and 24. The upper end of the spindle 7 take in a recess or socket in the underface of the table 21 and raises it on being rotated.

A ball race 25 is formed partly in a cover plate 26 and partly in the lower face of the bevel wheel 8 and a circumferential lip 27 takes in a corresponding groove 28 in said wheel to prevent the entrance of dust. A collar or nut 29 retains the cover plate 24 in position and is provided with adjusting screws 30 whereby the wear may be taken up. A similar ball race is interposed between the under side of the enlarged head 31 on the spindle and the upper face of the wheel 9.

When the locking piece 10 is positioned so that the lug 10$^b$ engages the keyway of the bevel wheel 9 and thus holds this bevel wheel in engagement with the spindle 7 and the lever 18 is reciprocated, the spindle is rotated continuously first through one pawl and ratchet and bevel wheel and then through the other pawl, ratchet, bevel wheel and pinions, the wheel 9 thus causing the wheel 8 to continue its motion, the plate or arm 22 being non rotatable. Continuous rotation of the spindle is thus obtained and as it rises in the threaded portion of the standard 4 its opposite end forces the table 21 upwardly together with the weight thereon.

By disengaging one of the spring pawls from its respective ratchet, an intermittent rotation of the spindle is obtained.

To lower the table the key 10 is moved upwardly so as to move the lug 10$^b$ out of engagement with the bevel wheel 9 and the lug 10$^a$ into engagement with the bevel wheel 8 and giving a reverse movement to the spindle and consequently lowering its screwed end in the bottle.

Having thus described my invention, what I claim as new and desire to protect by Letters Patent is:—

1. In a lifting screw jack, the combination with a standard, a hand lever having pawls pivotally mounted thereon, oppositely rotatable bevel wheels provided with ratchets adapted to be engaged and rotated respectively by said pawls, a non-rotatable plate, and bevel pinions carried by said plate and meshing with said bevel wheels, of a screw spindle capable of being selectively locked to one or the other of said bevel wheels and of being raised or lowered in said standard, and a table freely supported on the upper end of said spindle.

2. In a lifting screw jack, the combination with a standard having a guide, a hand lever having pawls pivotally mounted thereon, oppositely rotatable bevel wheels provided with ratchets adapted to be engaged and rotated respectively by said pawls, a plate, and bevel pinions carried by said plate and meshing with said bevel wheels, of a screw spindle capable of being selectively locked to one or the other of said bevel wheels and of being raised or lowered in said standard, a table freely supported on one end of said spindle, and a rod secured to said table and slidably mounted in said guide and plate for preventing rotation of the latter.

3. In a lifting screw jack, the combination with a standard, a hand lever having pawls pivotally mounted thereon, oppositely rotatable bevel wheels provided with ratchets adapted to be rotated by said pawls respectively, and bevel pinions meshing with said bevel wheels, of a screw spindle capable of being selectively locked to one or the other of said bevel wheels and of being raised or lowered in said standard, a head on the spindle, a table freely supported by said head, an adjustable cover, and ball races between said adjustable cover and one of said bevel wheels, and between said spindle head and the other of said bevel wheels.

4. In a lifting screw jack, the combination of a standard, a screw spindle adapted to engage said standard having a plain upper end provided with a keyway, bevel wheels provided with ratchets rotatably mounted on said spindle, a non-rotatable plate interposed between said bevel wheels, intermediate bevel pinions meshing with said bevel wheels, a hand lever having pawls pivotally mounted thereon adapted to engage said ratchets respectively, and a key slidably mounted in said keyway having spaced lugs thereon adapted to selectively engage one or the other of said bevel wheels for rotation with the screw spindle whereby oscillation of said hand lever results in the continuous rotation of the screw in one or the other direction dependent upon the position of said spaced lugs.

In testimony whereof I have hereunto set my hand.

JOHN RAVEN.